March 19, 1940.  W. F. GROENE ET AL  2,194,203
LATHE APRON
Original Filed June 10, 1936   8 Sheets-Sheet 2
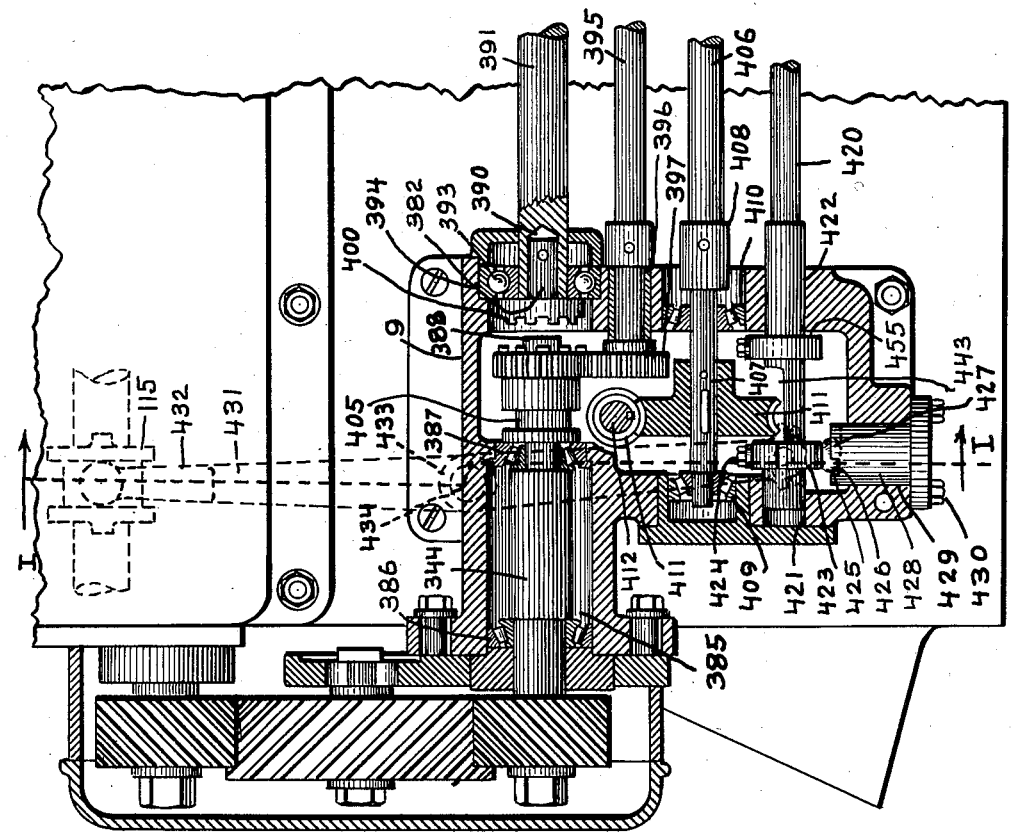
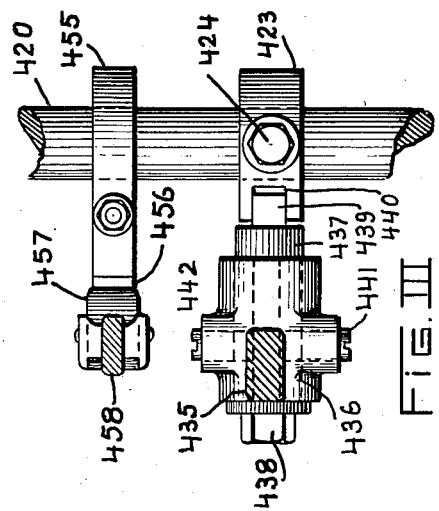
INVENTORS.
WILLIAM F. GROENE
ARTHUR W. AUFDERHAR
BY
ATTORNEY.

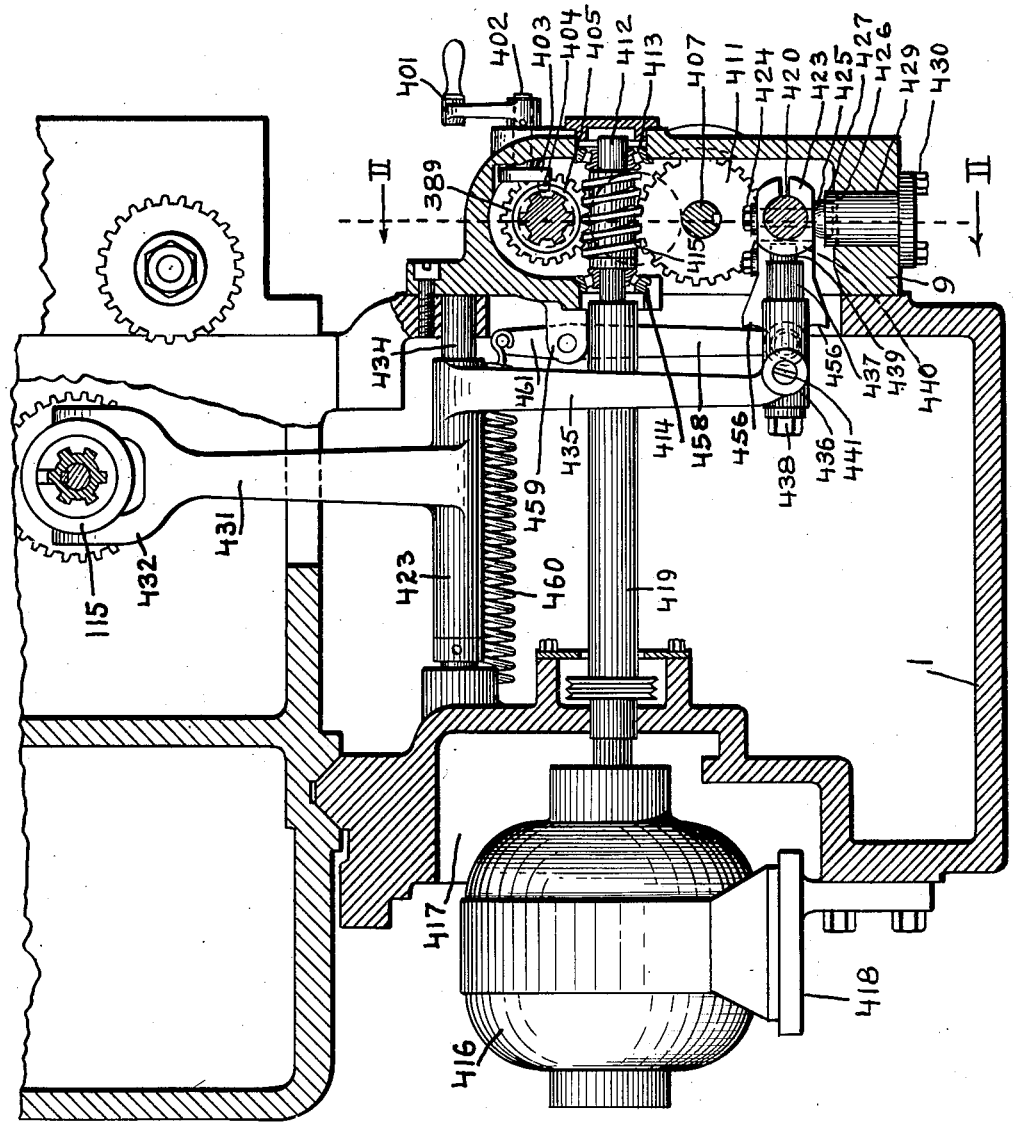

March 19, 1940.  W. F. GROENE ET AL  2,194,203
LATHE APRON
Original Filed June 10, 1936    8 Sheets-Sheet 3
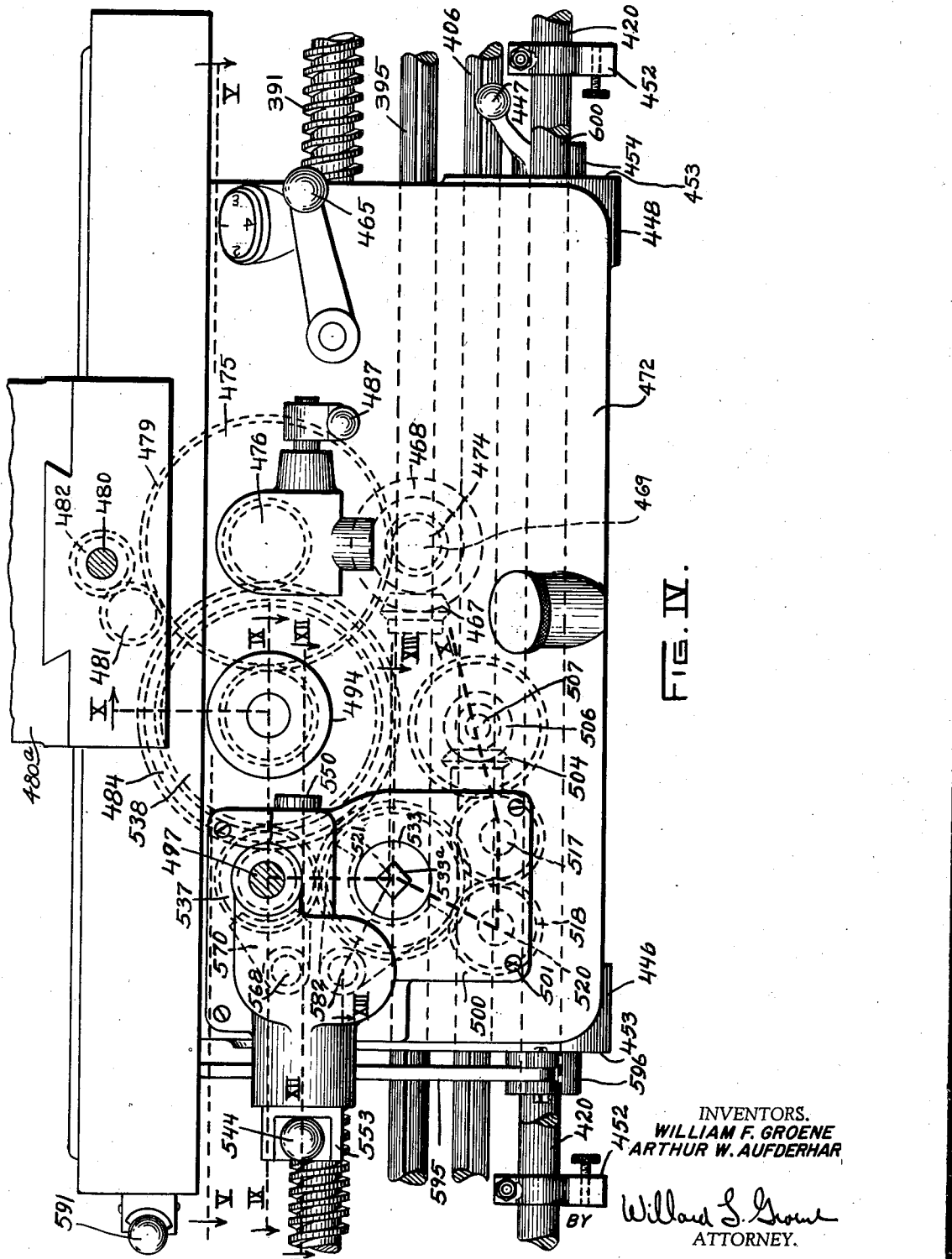
INVENTORS.
WILLIAM F. GROENE
ARTHUR W. AUFDERHAR
BY Willard S. Groene
ATTORNEY.

March 19, 1940. W. F. GROENE ET AL 2,194,203
LATHE APRON
Original Filed June 10, 1936    8 Sheets-Sheet 4
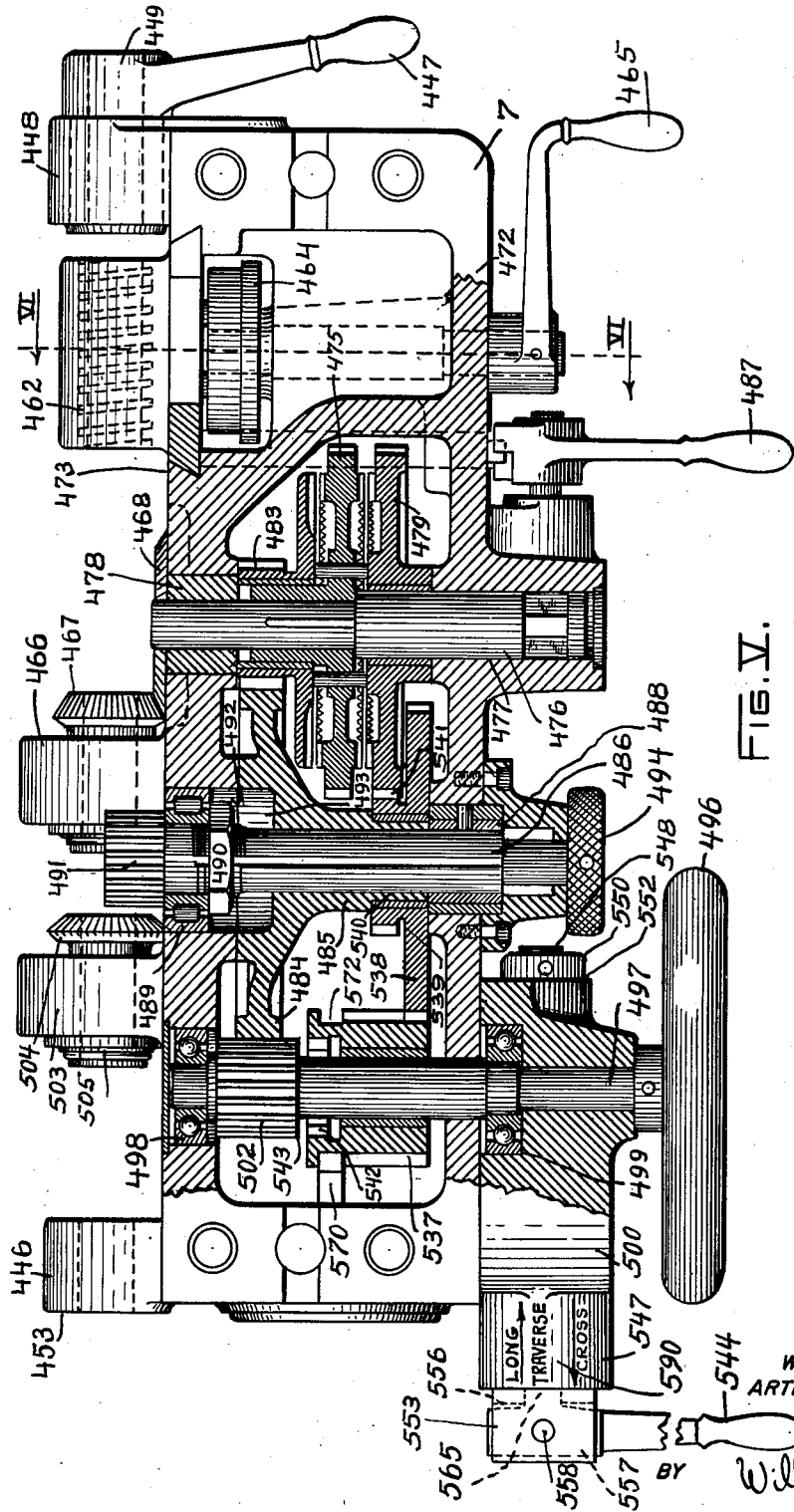
FIG. Ⅵ.
INVENTORS.
WILLIAM F. GROENE
ARTHUR W. AUFDERHAR
BY Willard S. Groene
ATTORNEY.

March 19, 1940.  W. F. GROENE ET AL  2,194,203
LATHE APRON
Original Filed June 10, 1936  8 Sheets-Sheet 5
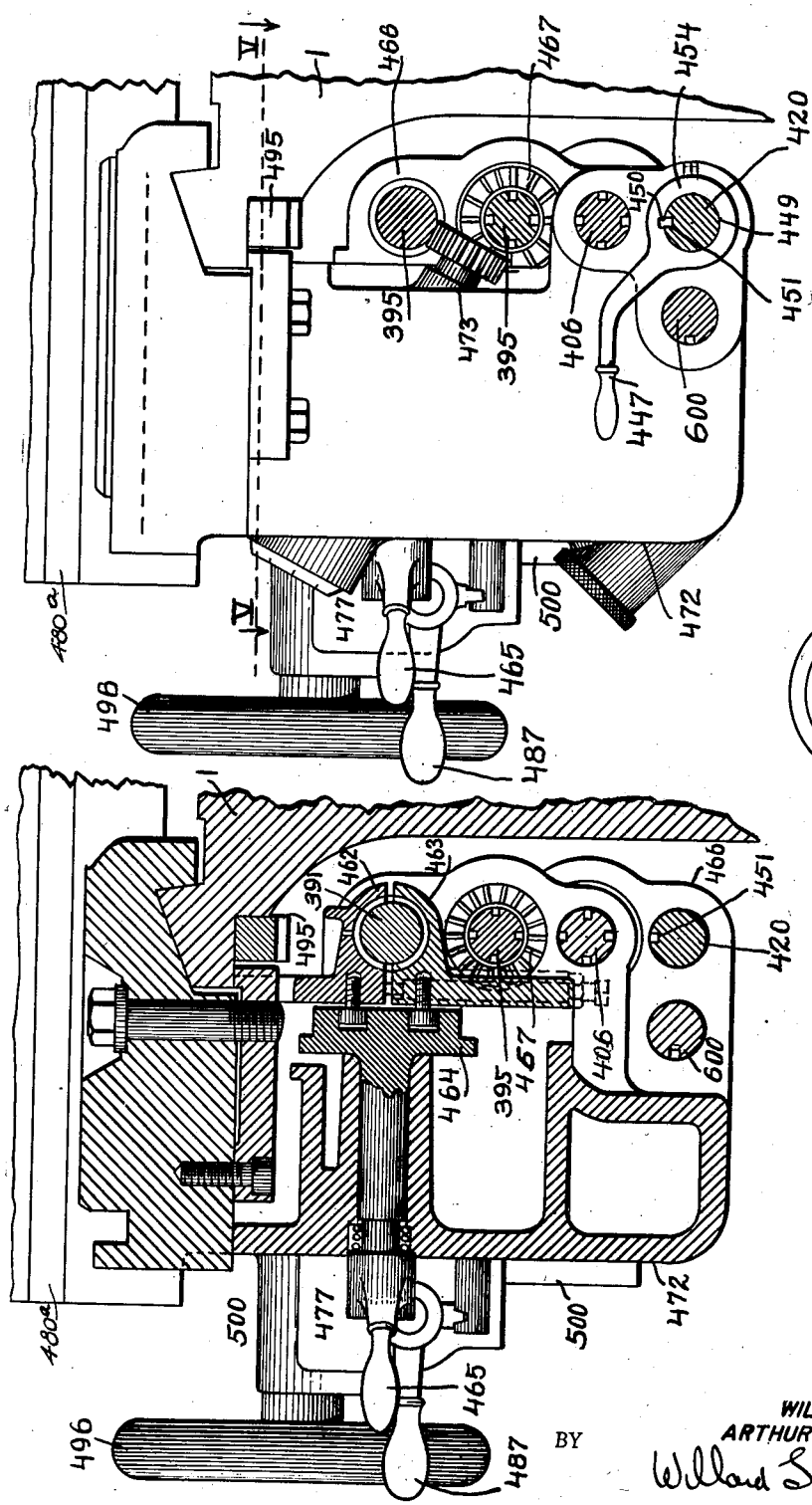
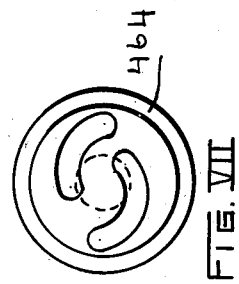
Fig. VIII.
Fig. VII.
Fig. VI.
INVENTORS.
WILLIAM F. GROENE
ARTHUR W. AUFDERHAR
BY Willard S. Groene
ATTORNEY.

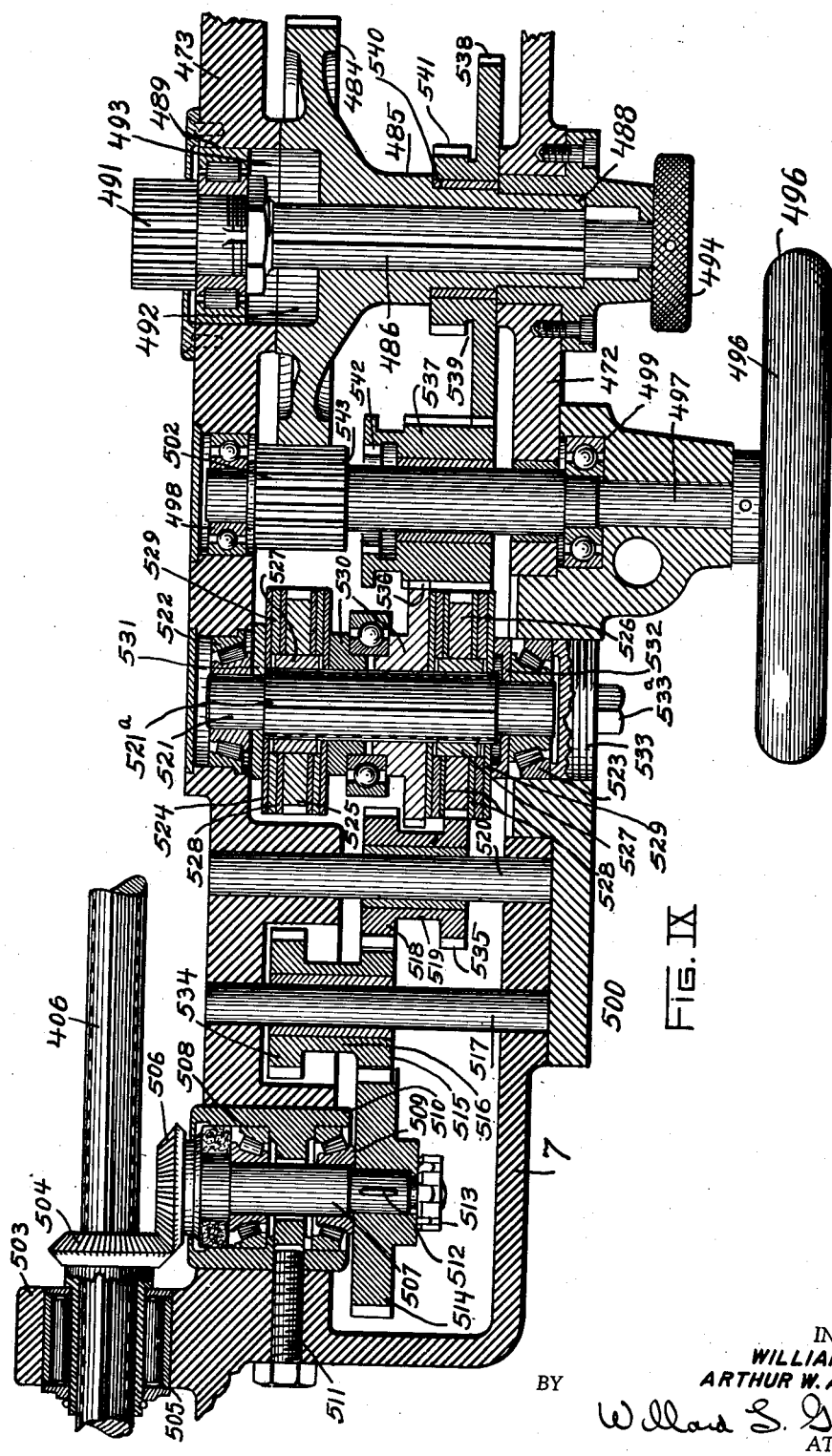

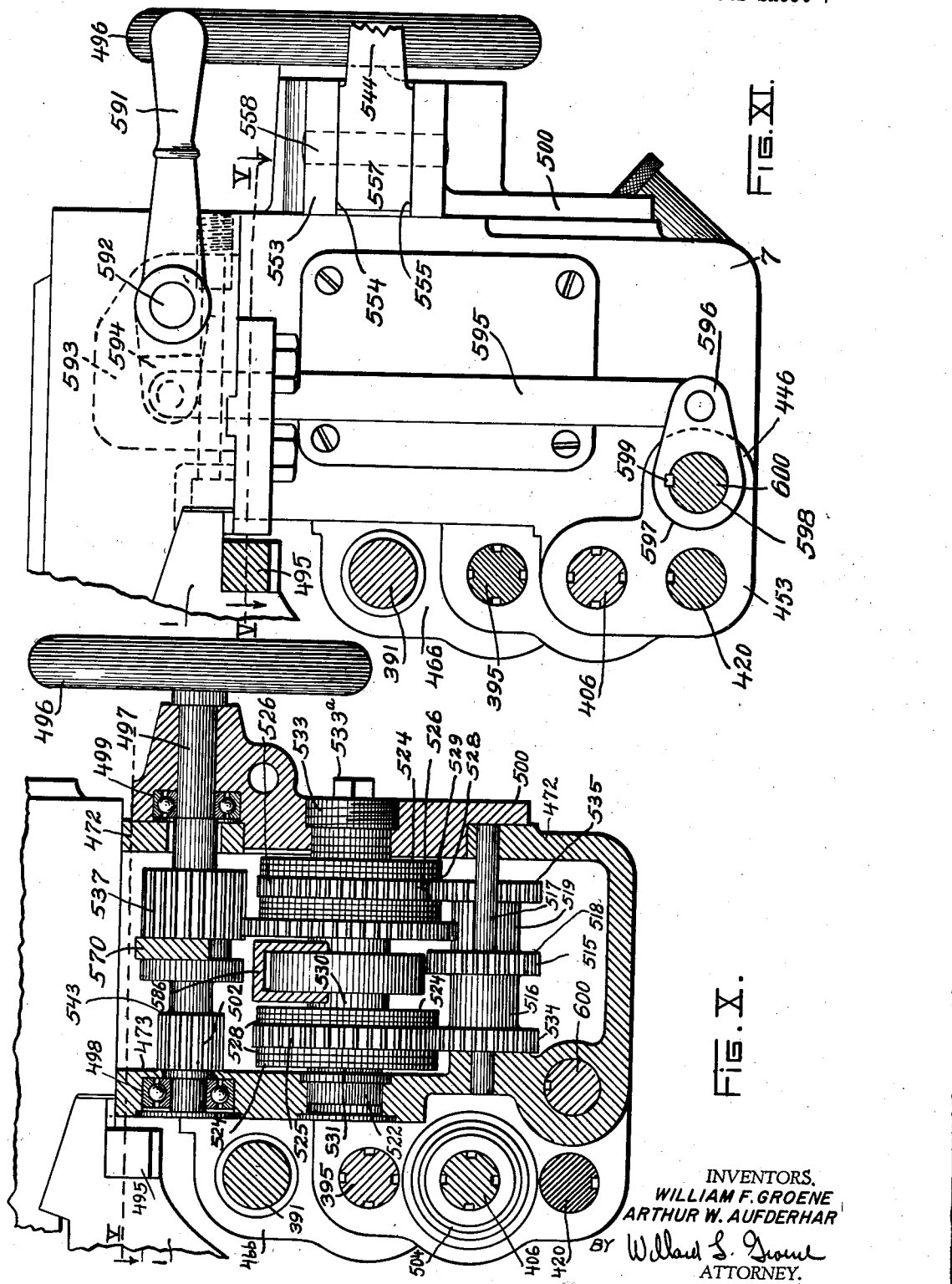

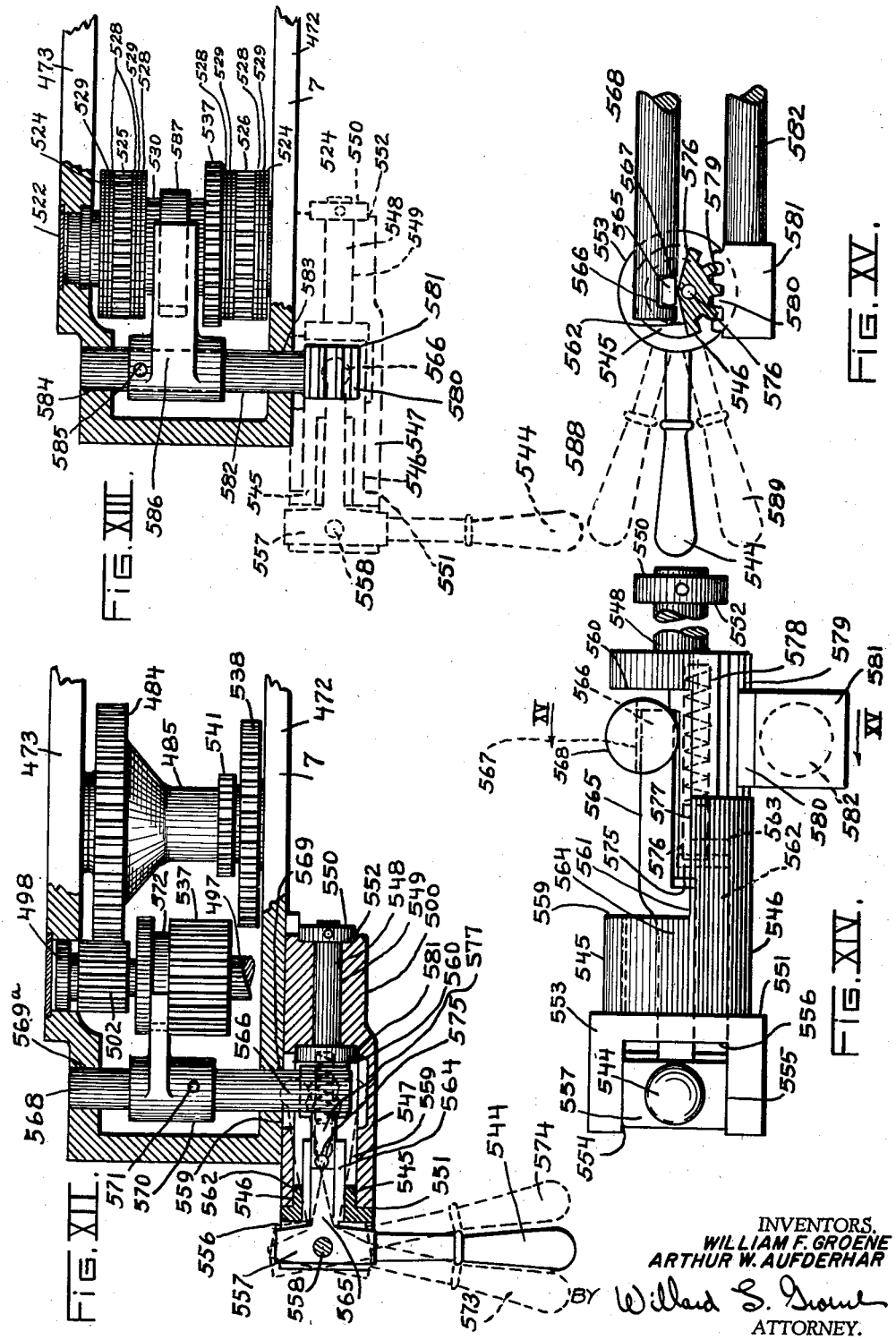

Patented Mar. 19, 1940

2,194,203

UNITED STATES PATENT OFFICE 2,194,203

LATHE APRON

William F. Groene and Arthur W. Aufderhar, Cincinnati, Ohio, assignors to The R. K. Le Blond Machine Tool Company, Cincinnati, Ohio, a corporation of Delaware Original application June 10, 1936, Serial No. 84,500. Divided and this application January 18, 1938, Serial No. 185,562

11 Claims. (Cl. 82—22)

This is a divisional application of application Serial Number 84,500 filed June 10, 1936. This invention pertains particularly to lathe aprons and mechanism associated therewith for rapid traversing the carriage and cross slide of the lathe to which it is applied. For purposes of an exemplary disclosure we show the apron incorporated in a lathe of a character set forth in the above mentioned application Serial Number 84,500 which lathe has a feed box and associated feed drive mechanism of a character set forth in application Serial Number 171,760 filed October 28, 1937.

An object is to provide a novel control box for the operating rods of the apron which is mounted on the bed of the lathe and is totally enclosed and flooded with lubricant. In this novel control box we provide a unique mechanism operating in conjunction with operating mechanism on the apron for the quick and easy reversal of the direction of feeding mechanism and lead screw for the carriage.

In the apron of this lathe we provide a mechanism for engaging and disengaging the longitudinal and cross feed, of a character substantially as disclosed and claimed in Patent No. 1,944,231, issued January 23, 1934. We provide a mechanism for operating the lead screw half-nuts as shown in Patent No. 980,971, issued January 10, 1911. An interlock between this feed control mechanism and the lead screw half-nuts is also substantially of a character shown in Patent No. 1,944,231.

We have also provided in the apron a unique mechanism for imparting a rapid traverse to the longitudinal feed and to the cross feed, in either direction, whereby a single lever completely controls any of the desired directions of traverse.

The above features will be described in detail and additional features will be pointed out in the following description.

In the drawings:

Fig. I is a vertical transverse section through the feed drive mechanism on the line I—I of Fig. II showing the rapid traverse drive and feed reverse mechanism.

Fig. II is a vertical longitudinal section through the feed drive mechanism on the line II—II of Fig. I, showing the gearing from the feed box and the mounting of the lead screw and the various feed and control rods.

Fig. III is a detailed plan view partly in section showing a portion of the feed reverse mechanism shown in Figs. I and II.

Fig. IV is a front elevation of the lathe apron showing the various gear trains for operating the feed and traverse mechanisms.

Fig. V is a horizontal section on the line V—V of Figs. IV and VIII showing the longitudinal and cross feed operating mechanism.

Fig. VI is a transverse section through the apron along the line VI—VI of Fig. V showing the mechanism for engaging the lead screw for thread chasing.

Fig. VII is a face view of the scroll cam for operating the half-nuts when thread chasing.

Fig. VIII is an elevation of the right hand end of the apron showing particularly the chasing dial and the feed and lead screw reversing handle.

Fig. IX is a diagrammatic section on the line IX—IX of Fig. IV showing the transmission mechanism for rapid traverse to the carriage and cross slide.

Fig. X is a transverse section through the apron on the line X—X of Fig. IV showing the rapid traverse reversing mechanism.

Fig. XI is an elevation of the left hand end of the apron showing the spindle control handle.

Fig. XII is a horizontal section on line XII—XII of Fig. IV showing the mechanism for engaging either the longitudinal or cross rapid traverse motions.

Fig. XIII is a horizontal section on line XIII—XIII of Fig. IV showing the mechanism for reversing the rapid traverse motions.

Fig. XIV is a detailed front elevation of a portion of the operating mechanism of Fig. XII.

Fig. XV is a detailed view partly in section on the line XV—XV of Fig. XIV.

Referring particularly to Figs. I and II, the drive shaft 344 is journaled in the bore 385 of the control box 9 on the anti-friction bearings 386 and 387. Projecting outward from the bearing 387 the shaft 344 has a splined extension 388 upon which is slidingly mounted a clutch gear 389. In the bore 390 in the end of lead screw 391 there is securely fixed a driving clutch member 392 which member also securely holds an anti-friction bearing 393 on the end of the lead screw 391. The bearing 393 is secured in the bore 394 of the control box 9 so that the lead screw 391 and clutch member 392 will have their axes coinciding with the axis of the drive shaft 344.

Directly below the lead screw 391 the feed rod 395 is journaled in the bearing bushing 396 fixed in the control box 9 and having the driving gear 397 fixed to its inner end projecting from the bearing 396. The clutch gear 389, when shifted to the left, Fig. II, causes its integral gear 398 to engage and drive the gear 397 on the feed rod 395. When the clutch gear 389 is shifted to the right the gears 397 and 398 will be disengaged and the clutch teeth 399 and 400 will engage so that the lead screw 391 will be driven directly from the drive shaft 344.

A control lever 401, Fig. I, mounted on the front of the control box 9, convenient for the operator, is fixed to a rock shaft 402 which has a disc 403 formed on its inner end. A pin 404, fixed eccentrically of the disc 403, engages in the annular slot 405 of the clutch gear 389 so that as the handle is moved to the right or left the lead screw 391 or feed rod 395 may be alternately driven by the drive shaft 344. It is to be noted that by this arrangement the feed rod and lead screw can not be operated simultaneously and therefore one or the other are not running idle when not in use as in former constructions. It is also to be noted that the lead screw 391 is adapted to be driven directly from the helical gear driven shaft 344 which arrangement provides a smooth, powerful drive to the lead screw for accurate and smooth thread cutting.

Located directly below the feed rod 395 and parallel thereto is the rapid traverse rod 406 fixed to the end of the worm wheel shaft 407 by a suitable connection 408. The worm wheel shaft 407 is journaled in anti-friction bearings 409 and 410 mounted in the control box 9 and has fixed to it, intermediate the bearings, a worm wheel 411. A worm shaft 412 located at right angles to the shaft 407 and journaled on anti-friction bearings 413 and 414 has an integral worm 415 adapted to engage and drive the worm wheel 411.

The constant speed rapid traverse motor 416 located in the cavity 417 and fixed to a bracket 418 bolted to the bed 1 of the lathe, is connected to the worm shaft 412 by means of a suitable power transmission shaft 419 extending transversely through the bed 1. The rapid traverse motor 416 is arranged to operate constantly, by suitable electrical means, not shown, whenever the lathe is being operated, regardless of whether the main drive motor, located in the leg 2 of the lathe, is running or not running. Power take-off from the rapid traverse rod 406 will, therefore, be available at all times during the operation of the lathe. Should a friction stop, brake, and reverse mechanism be used, the shaft 419 would then be driven directly from the main driving motor for the headstock transmission as is usual for lathes.

*Feed stop and reverse mechanism*

We have provided a completely enclosed and simplified mechanism for stopping and reversing the feed to the carriage by a manipulating lever located on the apron 7. More particularly, in the control box 9, Figs. I, II, and III, the feed control rod 420 is journaled immediately below and parallel with the rapid traverse rod 406 for both rotary and axial movements in the bearings 421 and 422. Intermediate the bearings 421 and 422 and adjacent the bearing 421 there is fixed a split collar 423 secured to the rod 420 by a suitable bolt 424 extending diametrically through the collar and shaft. On the lower projection of the bolt 424 is mounted a roller 425 adapted to engage in a slot 426 formed in the upper end 427 of the cam member 428. The cam 428 is mounted in the bore 429 extending vertically through the bottom of the control box 9 and secured therein by suitable cap screws 430. The slot 426 is usually positioned at a substantial angle to the axis of the control rod 420. It can be seen by this arrangement that when the rod 420 is rotated through a small arc the operation of the roller 425 in the slot 426 will cause the rod to be moved axially in either direction depending upon the direction of rotation of the shaft. Also, by this arrangement, if the rod 420 is moved axially in either direction it will be correspondingly rotated in either direction through a small arc. The effect of the roller 425 in the slot 426 is to produce combined rotary and axial motions in the control rod 420 with high efficiency and a minimum of friction loss.

A shifter member comprising the lever 431 having a forked yoke 432 adapted to engage around the feed reversing clutch 115, for axial shifting thereof, is pivotally mounted by its hub 433 on the shaft 434 fixed in the bed 1 of the lathe. A lever 435 depending from the hub 433 has mounted in its lower end 436 a stud 437 secured therein by means of the nut 438 and having a projection 439 adapted slidingly to engage in a tangential slot 440 formed in the collar 423. Set screws 441 and 442 threaded in lower portion 436 of the lever 435 provide means for adjusting the stud 437 in the elongated hole 443 axially of the rod 420, the purpose of which arrangement is to facilitate proper positioning of the shifter levers 431 and 435 relative to the clutch 115 and the collar 423 on the rod 420 when assembling the apparatus described. It is to be noted that axial movement of the shaft 420 through the levers 435 and 431 will impart opposite axial movement to the clutch 115. It is further to be noted that the effect of the projection 439 operating in the slot 440 is to allow free rotary movement of the rod 420 while at the same time imparting the axial motion of the rod 420 to the lever 435 as described.

The rod 420 extending from the control box 9 longitudinally of the bed 1 in a conventional manner, is supported in the usual bearing box 4 fixed to the tailstock end of the bed and in a suitable bearing 445 in the depending boss 446 formed integral with the apron 7. The feed stop and reverse control lever 447, Figs. IV, V and VIII, is journaled in the integral boss 448 and arranged so as to have substantially no axial movement therein. The lever has an axial bore 449 adapted to receive the rod 420. The key 450 fixed to the bore 449 is adapted to slidingly engage the keyway 451 formed longitudinally through the length of apron travel of the rod 420. It can thus be seen that no matter what longitudinal position is selected for the apron along the bed, the control lever at all times can be raised or lowered to rock the rod 420 in either direction for reversing or stopping the feed through the mechanism already described.

Means for stopping the longitudinal feed by motion of the apron along the bed comprises providing suitable axially adjustable trip dogs 452, Fig. IV, secured to the rod 420 which are engaged by the surfaces 453 of the boss 446 and the surface 454 of the control lever 447 as the apron moves longitudinally of the bed whereby to move the rod axially to move the clutch 115 to neutral position through the mechanism described.

In order to facilitate locating the feed positions and intermediate neutral position of the rod 420 when manipulated by the lever 447 and to hold the rod in the position selected by the lever or by movement of the rod by contact of the apron with the trip dogs 452 as described, a detent arrangement, Figs. I, II, and III, is provided for the rod 420. Intermediate the bearings 421 and 422 of the rod 420 in the control box 9 and adjacent the bearing 422 there is fixed to the rod 420 a radially extending lug 455 having arcuate detents 456 corresponding to the feed and neutral positions of the rod 420 formed circumferentially of its outer end. A roller 457 is journaled in the end of a suitable lever 458 which is pivotally mounted on the lug 459 formed integral with the control box 9. A tension spring 460 connected to an extension 461 of the lever 458 beyond its pivotal mounting 459 and fixed to the bed 1 of the lathe, provides means for yieldingly urging the lever 458 and roller 457 into the respective detents 456 when the rod 420 is shifted.

*Apron rapid traverse mechanism*

Referring particularly to Figs. V, VI, and VII, the lathe apron 7 has the usual half nuts 462 and 463 adapted to engage the lead screw 391 when thread cutting operations are being performed. These half nuts are operated by the usual scroll cam 464 to which the operating handle 465 is attached, substantially as disclosed in Patent No. 980,971, issued January 10, 1911.

We provide in this lathe apron a mechanism for operatively connecting either the cross-feeding mechanism or longitudinal-feeding mechanism with the driving means of the lathe, of a character substantially as described and claimed in Patent No. 1,944,231, issued January 23, 1934. The driving power for operating the cross and longitudinal feeding mechanism is derived from the feed rod 395 which is driven from the main driving motor for the lathe by the mechanism, for example, by an arrangement disclosed in co-pending applications Serial Number 84,500 filed June 10, 1936 and Serial Number 171,760 filed October 29, 1937.

In an integral box 466, Fig. V, there is rotatably mounted the bevel gear 467, having a splined bore into which the feed rod 395 slidingly engages so that the bevel gear 467 may be rotated by the rod 395 at all times whether the apron 7 is stationary or is feeding longitudinally. Noting particularly Fig. IV, the bevel gear 467 is adapted to drive a mating bevel gear 468 mounted on the shaft 469 journaled, at right angles to the feed rod 395, in suitable bearings formed in the front wall 472 and rear wall 473 respectively of the apron 7. Intermediate the walls 472 and 473 a driving pinion 474 is fixed on the shaft 469 and is adapted to drive the shiftable middle gear 475, Fig. V, which is securely keyed and pinned to the shifter shaft 476. This shaft is journaled for both axial and rotary movements in suitable bearings 477 and 478 provided in the respective walls 472 and 473 of the apron 7. To the front of the shiftable gear 475 the front outer gear 479 is rotatably journaled on the shifter shaft 476 and is adapted to drive the cross feed screw 480 for actuating the cross slide 480a through the idler gear 481 suitably journaled in the carriage 6. This idler in turn meshes with the cross feed screw pinion 482, Fig. IV.

To the rear of the shiftable gear 475, there is rotatably journaled on the shifter shaft 476 the rear outer gear 483, which is adapted to drive the gear 484 mounted by slidable splined connection 485 on the rack pinion shaft 486. A feed control handle 487 is utilized for selecting and disengaging the cross or longitudinal feeding by axially moving the shifter shaft 476 in a manner fully disclosed in Patent No. 1,944,231. Interlocking means (not shown) between this mechanism and the mechanism for operating the half-nuts is provided substantially as shown in Patent No. 1,944,231.

The splined rack pinion shaft 486, Figs. V and IX, is journaled in a suitable bearing 488 in the front wall 472 of the apron and is supported in an anti-friction bearing 489 in the rear wall 473. The inner race of the bearing 489 is secured to the shaft 486 by a suitable nut 490 which holds the bearing firmly against the integral rack pinion 491 formed on the shaft 486. The outer race of the anti-friction bearing 489 is adapted for axial movement in the bore 492 in the rear wall 473 and in a mating bore 493 in the gear 484. The shaft is also adapted for axial movement in the bearing 488. A pull knob 494 is fixed to the front end of the shaft 486 to facilitate manual movement of the rack pinion shaft 486 axially. The purpose of this is to enable the operator of the lathe to withdraw the rack pinion 491 from the rack 495 fixed to the bed 1 when using the lead screw and half-nuts in thread chasing. This arrangement thereby avoids the necessity of driving the various gear trains of the apron through the rack 495 and pinion 491 when the apron is being moved by the lead screw. Hence we prevent inaccuracies in the thread chasing and excessive wear of the lead screw and half-nuts.

The usual handwheel 496 for manual longitudinal feeding of the carriage is fixed on the handwheel shaft 497. This shaft is journaled in an anti-friction bearing 498 mounted in the rear wall 473 of the apron and in an anti-friction bearing 499 mounted in a bracket 500 secured to the front of the apron wall 472 by suitable screws 501. Between the bearings 498 and 499 and adjacent the bearing 498 there is formed the integral drive pinion 502 of the shaft 497, which is adapted to engage and drive the gear 484, so that the rack pinion 491 may be rotated by the handwheel 496 whereby to move the carriage longitudinally substantially as shown in Patent 1,944,231.

We have provided in addition to the apron mechanism described above, a novel mechanism to produce longitudinal and cross rapid traverse motions in either direction. We have further provided a novel single lever control for quickly and easily selecting the various rapid traverse motions. The main source of driving power for the apron rapid traverse mechanism in the particular lathe here shown is derived from the rapid traverse rod 406 which is driven at constant speed at all times during the operation of the lathe.

In the boss 503, Figs. IV, V and IX, the bevel gear 504 is journaled in a suitable bearing 505 adapted to prevent axial movement of the bevel gear 504. The bevel gear 504 has a splined bore into which the rapid traverse rod 406 slidingly engages, so that the bevel gear 504 may be rotated by the rapid traverse rod 406 at all times whether the apron is stationary or is feeding longitudinally. A mating bevel gear 506, adapted to be driven by the bevel gear 504, is formed integral with the shaft 507 which is journaled perpendicular to the rapid traverse rod 406 in suitable anti-friction bearings 508 and 509 which bearings in turn are mounted in the sleeve 510 secured in the rear wall 73 of the apron 7 by a suitable bolt 511. Mounted on the inner end of the shaft 507 and secured and held in driving relation thereon by means of the key 512 and lock nut 513 is a gear 514 adapted to engage and drive the gear 515 of the compound gear 516, the compound gear being rotatably journaled on the shaft 517 fixed in the front wall 472 and rear wall 473 of the apron 7, Figs. IX and X. The gear 515 also engages the gear 518 of the compound gear 519 which is journaled on the shaft 520 fixed in the front wall 472 and rear wall 473 of the apron.

The traverse reverse and forward friction clutch assemblies are mounted on the shaft 521 which is journaled in the anti-friction bearing 522 mounted in the rear wall 473 and in the anti-friction bearing 523 slidably mounted in the bracket 500 on the front wall of the apron 7. The portion of the shaft 521 intermediate these bearings is provided with splines 521a upon which are mounted the clutch assemblies comprising the hardened steel plates 524, fitting in driving relation but adapted to axial movement on the splines 521a; the driving gears 525 and 526 which have sleeves 527 fixed in their axial bores so that the gears 525 and 526 may revolve freely on their sleeves 527 upon the periphery of the shaft 521; hardened steel discs 528 rotatably mounted on projections of the sleeves 527 and adjacent the faces of the gears 525 and 526; and suitable composition friction discs 529, also rotatably mounted on projections of the sleeve 527, are located between the various pairs of steel discs 524 and 529. Between these clutch assemblies is mounted, on the splines 521a, the clutch operating member 530 adapted to axial movement on the splines of the shaft 521. Suitable thrust collars 531 and 532 adjacent the respective bearings 522 and 523 provide means for properly confining the clutch assemblies and operating member 530 between the bearings 522 and 523. An adjustable bearing retainer 533 having a squared portion 533a adapted to receive a suitable wrench, threaded in the bracket 500, provides easily accessible means for adjusting the bearing 523 axially of the shaft 525 for the purpose of properly setting the relative position of the clutch plates for proper driving engagement. It can thus be seen that as the clutch operating member 530 is urged axially toward the rear of the apron, the normally loose running gear 525 will be clamped between the respective clutch plates 524, 528, and 529, in driving engagement with the shaft 521. Likewise the gear 526 may be engaged in driving relation with the shaft 521 when member 530 is urged to the front of the apron.

The gear 525 is driven from the compound gear 516 by means of the gear 534; and the gear 526 is driven from the compound gear 519 by means of gear 535. The compound gears 516 and 519 are kept properly axially positioned upon their respective fixed shafts 517 and 520 by contact of the sides of the teeth of the gears 534 and 535 with the hardened steel plates 528 adjacent the corresponding meshing gears 525 and 526. It can therefore be seen that since the shaft 507 rotates at constant speed, in the same direction by the means described, rotation of the gear 525 will therefore be produced through the three gears 514, 515, and 534, while rotation of gear 526 will be produced through the four gears 514, 515, 518 and 535. It thus follows that the gears 525 and 526 rotate in opposite directions and that by alternately engaging one or the other clutch assemblies by the appropriate axial movement of the member 530, corresponding directions of rotation in either direction can be produced in the shaft 521 and member 530.

The mechanism for alternately connecting the above forward and reverse rapid traverse driving power to the longitudinal and cross travel of the carriage and cross slide comprises the gear 536 formed integral with the member 530 which is adapted for driving engagement with the axially slidable clutch gear 537 journaled for free rotation on the handwheel shaft 497, Figs. IV, V, IX, X, and XII. When shifted axially toward the front of the apron, the gear 537, which is at all times in driving engagement with the gear 536, meshes with a gear 538 of the compound gear 539 which compound gear is journaled for free rotation upon a suitable extension 540 of the hub of the gear 484. The gear 541 of the compound gear 539 in turn is connected in driving relation with the gear 479, Figs. IV and V, which drives the cross feed mechanism as described.

The gear 537 has an internal clutch 542 adapted to engage over a portion 543 of the pinion 502 whereby to provide a positive driving connection between the gear 537 and pinion 502 so as to impart longitudinal rapid traverse movements to the carriage through the gear 484 and rack pinion 491 as described. It can thus be seen from the above description that the gear 537 can be caused to rotate at rapid traverse speeds in either direction, through the forward and reverse clutch assemblies described, and that when the gear 537 is shifted toward the front of the apron, rapid traverse may be applied in either direction to the cross slide and when the gear 537 is shifted toward the rear of the apron, rapid traverse may be provided to longitudinal movement of the carriage in either direction.

We have provided a novel single lever control mechanism for alternately applying rapid traverse motions in either direction to the longitudinal and cross travel of the carriage and cross slide. Referring particularly to Figs. IV and XV, the rapid traverse control lever 544 is conveniently located on the left hand end of the apron 7 directly to the left of the handwheel 496, Fig. IV. In the bracket 500 is mounted the rock shaft 545 having a large diameter 546 rotatably fitting in the large bore 547 and a smaller diameter 548 rotatably fitting in the small bore 549. A suitable thrust collar 550 is fixed to the outer end of the small diameter 548 to prevent axial movement of the rock shaft 545 by confining the shaft 545 between the face 551 of the large diameter 546 and the inner face 552 of the collar 550. These faces contact appropriate faces of the bracket 500 adjacent the bores 547 and 548.

The left hand end, Figs. XII and XIV, of the rock shaft 545 comprises a bifurcated portion 553 having a transverse slot formed therein by the faces 554, 555, and 556. The control handle 544 has a squared portion 557 which is adapted to fit nicely between the faces 554 and 555 and is pivotally mounted on the pin 558 passing diametrically through the portions 553 perpendicular to the faces 554 and 555. The purpose of this arrangement is to permit horizontal movement of the handle 554 substantially parallel to the axis of the rock shaft 545. It is also to be noted that the handle 544 may be moved up and down in a vertical plane as it is confined between the faces 554 and 555. This causes rotation of the rock shaft 545 in the bracket 500.

In the large diameter 545 is formed a tangential transverse slot comprising the faces 559, 560, and 561. Extending axially to the right, Figs. XII and XIV, from the face 556 in the rock shaft 545, is a relatively large bore 562 having a depth indicated by the line 563 which thereby causes this bore 562 to break into the transverse slot in the large diameter 546 and form a passageway 564 from the bore 562 into the transverse slot. Formed integral with the squared portion 557 of the control handle 544 is a lever arm 565 extending to the right, Figs. XII, substantially on the axis of rotation of the rock shaft 545, through the bore 562 and passageway 564 into the transverse slot formed in the large diameter 546. The arm 565 has a rounded end 566 adapted to engage in an appropriate slot 567 formed in the shifter rod 568 which is mounted in the front wall 472 and rear wall 473 for axial movement in the respective bores 569 and 569a of the walls of the apron 7. A shifter yoke 570 fixed on the rod 568 intermediate the bores 569 and 569a, by a suitable pin 571 engages the annular slot 572 of the gear 537 so that axial motion of the rod 568 will cause corresponding axial shifting of the gear 537 on the shaft 497. It can thus be seen, Fig. XII, that horizontal movement of the control handle 544 will cause the arm 565 to move so as to move the rod 568 axially, and thereby shift the gear 537. Thus when the lever 544 is shifted horizontally to the left to position 573, the gear 537 will be shifted into mesh with gear 538 thereby connecting the rapid traverse power to the cross feed mechanism as described. Likewise, when the control handle is moved to the right to position 574, the internal clutch 542 of gear 537 engages with the pinion 502 to connect the rapid traverse power to the longitudinal feeding mechanism as described.

In order conveniently and automatically to hold the control handle 544 in the respective selected positions 573 and 574, a detent is provided comprising a pin 575 fixed on the lower side of the arm 565, adjacent but not contacting the bottom 563 of the bore 562. Carried in the longitudinal bore 576 in the rock shaft 545 is a plunger 577 yieldingly urged toward the pin 575 by a suitable compression spring 578. With this arrangement the tendency is for the plunger to "ride off" to either side of the pin 575 so as to hold the handle in either of the positions 573 and 574 selected by the operator.

Located on the under side of the large diameter 546 of the rock shaft 545 is a segmental gear 579 adapted to engage a rack 580 cut in the squared end 581 in the forward and reverse clutch shifter rod 582. The rod 582 is mounted in suitable bores 583 and 584 for axial movement in the respective walls 472 and 473 of the apron 7. Fixed to the rod 582, intermediate the bores 583 and 584, by means of a suitable pin 585 is a shifter yoke 586 adapted to engage the outer race of an anti-friction bearing 587, which bearing has its inner race secured to the member 530, the result being that axial shifting of the rod 582 will cause axial shifting of the member 530 for engaging the forward and reverse clutch assemblies as described. It can thus be seen that vertical movement of the handle 544, Fig. XV, will cause the segmental gear 579 to move the rack 580 and thereby move the rod 582 axially to shift the member 530. It is to be noted that when the lever 544 is held in the upper position 588, the rod 582 will be moved toward the front of the apron so that the clutch assembly, driven by gear 526, will be engaged. When the lever 544 is held in the lower position 589 the rod 582 will be moved toward the rear of the apron so as to engage the clutch assembly driven by the gear 525. It is to be further noted that since the end 566 of the arm 565 is located substantially on the axis of rotation of the rock shaft 545, no displacement of rod 567 results when vertical motion is imparted to the lever 544 so that reversing of the rapid traverse movement has no effect on whether the cross or longitudinal rapid traverse movements have been selected. Furthermore, this mechanism is so arranged that no damage can result from improper operation of the apron on the part of the operator. For instance, should either the cross or longitudinal feed be engaged or the half nuts be clamped on the lead screw, engagement of any of the rapid traverse motions will do no harm since, by this arrangement, the clutch assemblies can be so proportioned as to easily drive the normal traverse motions but to slip when such undue strains as those noted above may occur. Likewise, with this rapid traverse arrangement, the carriage may be traversed at full speed into the headstock or tailstock or the cross slide run the full length of its travel in either direction without damage to any part of the lathe. A conveniently located indicating dial 590 is provided on the bracket 500 adjacent the rapid traverse handle 544 to facilitate selecting the proper traverse motion on the part of the operator.

This apron is also provided with the usual spindle control mechanism comprising the lever 591, Figs. IV and XI, located on the left hand end of the carriage 6 on a suitable rock shaft 592 journaled in the carriage 6. The rock shaft 592 extends into a cavity 593 and has fixed on its inner end a lever 594 which lever is connected through a suitable link 595 to the lever arm 596 of the sleeve 597 pivotally mounted in the boss 446 of the apron 7. This sleeve 597, which is restricted so that it has substantially no axial movement in the boss 446, has a bore 598 with a key 599 fixed therein which slidingly engages the spindle control rod 600, extending longitudinally of the bed. The rod 600 is supported in suitable journals in the control box 9, the bearing box at the right hand end of the bed of the lathe and in bosses 446 and 448 of the apron. It can thus be clearly seen that manipulation of the spindle control lever 591 in a vertical plane will cause corresponding rocking of the rod 600 through the means described. Fixed to the rod 600 is a suitable lever and linkage which is operably connected to the electrical control mechanism, not shown, for the main driving motor of the lathe. In the event a friction clutch, brake, and reverse mechanism were to be used, this linkage would be adapted to operate such mechanism as is usual for lathes.

Having thus described our invention, what we claim as new and desire to secure by Letters Patent, is:

1. A lathe having in combination, a tool carriage having longitudinal and transverse travel on the lathe bed, means for moving the tool carriage longitudinally and transversely at feeding speeds, means for moving the tool carriage longitudinally and transversely at rapid traverse speeds, control means for rendering the first mentioned means effective and ineffective, and control means for rendering the second mentioned means effective and ineffective, comprising a single lever operable in two different planes.

2. A lathe having in combination, a carriage, a cross slide associated with the carriage, and an apron associated with the carriage, feeding means for alternately causing feeding movement in the carriage and cross slide, control means for rendering the feeding means effective, rapid traverse means for alternately causing rapid traverse movements in either direction in the carriage and cross slide, and control means for rendering the rapid traverse means effective at all times independent of any preselected position of the control means for the feeding means.

3. In a lathe apron having mechanism for feeding a carriage and cross slide of a lathe, a rapid traverse mechanism for traversing the carriage and cross slide comprising reversing transmission mechanism, a pair of clutches driven in opposite directions by the reversing transmission mechanism, means associated with said clutches and alternately drivable by one or the other of the clutches and releasable from both of the clutches, means for alternately connecting the first mentioned means to the feeding mechanism for the carriage and the feeding mechanism for the cross slide, and power means for driving the rapid traverse mechanism.

4. In a lathe apron having mechanism for feeding a carriage and cross slide of a lathe, a rapid traverse mechanism for traversing the carriage and cross slide comprising a reversing transmission mechanism, a pair of clutches driven in opposite directions by the reversing transmission mechanism, means associated with the clutches and alternately drivable by one or the other of the clutches and releasable from both of the clutches, means for alternately connecting the first mentioned means to the feed mechanism for the carriage and the feed mechanism for the cross slide, a single control means for actuating one or the other of the clutches and the last mentioned means, and power means for driving the rapid traverse mechanism.

5. In a lathe apron having mechanism for feeding a carriage and cross slide of a lathe, means for rapid traversing the carriage or the cross slide in either direction, control means for the first mentioned means comprising a single lever operable in two different planes, operation of the lever in one plane serving alternately to cause traverse motion in the carriage or cross slide, the operation of the lever in the other plane serving to reverse the traverse motion selected by operation of the lever in the first mentioned plane.

6. In a lathe apron having mechanism for feeding a carriage and cross slide of a lathe, a rapid traverse mechanism for traversing the carriage and cross slide comprising reversing transmission mechanism, a pair of clutches driven in opposite directions by the reversing transmission mechanism, means associated with the clutches and alternately drivable by one or the other of the clutches and releasable from both of the clutches, means for alternately connecting the first mentioned means to the feed mechanism for the carriage and the feed mechanism for the cross slide, a single control means for actuating one or the other of the clutches and the last mentioned means, a single control lever operable in one plane alternately to render one or the other of the clutches effective and operable in another plane to actuate the means for alternately connecting the first mentioned means to the feed mechanism for the carriage and the feeding mechanism for the cross slide, and power means for driving the rapid traverse mechanism.

7. In a transmission mechanism, means for delivering power alternately to one or the other of two separately movable members, and means for reversing the power delivered to each of the members, a single means for operating the delivery and reversing means, said single means comprising a lever operable in one plane for operating the delivery means and in another plane for operating the reversing means.

8. The combination set forth in claim 1 wherein a detent means is associated with the lever for yieldingly holding the lever in operable position in at least one of the planes in which the lever is operable.

9. The combination set forth in claim 5, wherein there is detent means associated with the lever to yieldingly hold the lever in operable position in the plane wherein the lever is operable alternately to cause traverse motion in the carriage or cross slide.

10. A lathe having in combination, a tool carriage having longitudinal and transverse travel on the lathe bed, means for effecting longitudinal and transverse rapid traverse movements in said tool carriage comprising transmission mechanism, means for driving said transmission at relatively high speed, means for selectively connecting said transmission to the tool carriage to effect either longitudinal or transverse rapid traverse movements therein, reversing mechanism in said transmission mechanism, and a single lever control device for controlling said last mentioned means and said reversing mechanism.

11. A lathe having in combination, a tool carriage having longitudinal and transverse travel on the lathe bed, means for effecting longitudinal and transverse feeding movements in said tool carriage, control means for said feeding means, means for effecting longitudinal and transverse rapid traverse movements in said tool carriage comprising transmission mechanism, means for driving said transmission at relatively high speed, means for selectively connecting said transmission to the tool carriage to effect either longitudinal or transverse rapid traverse movements therein, reversing mechanism in said transmission mechanism, and a single lever control device for controlling said last mentioned means and said reversing mechanism.

WILLIAM F. GROENE.
ARTHUR W. AUFDERHAR.